Oct. 21, 1952  G. L. A. DEVOS  2,614,404
HOMOKINETIC JOINT

Filed Oct. 5, 1948  8 Sheets-Sheet 1

GASTON LOUIS ARTHUR DEVOS
INVENTOR

By Flocks and Simon
ATTORNEYS

Oct. 21, 1952 G. L. A. DEVOS 2,614,404
HOMOKINETIC JOINT
Filed Oct. 5, 1948 8 Sheets-Sheet 2

GASTON LOUIS ARTHUR DEVOS
INVENTOR

By Flocks and Simon
ATTORNEYS

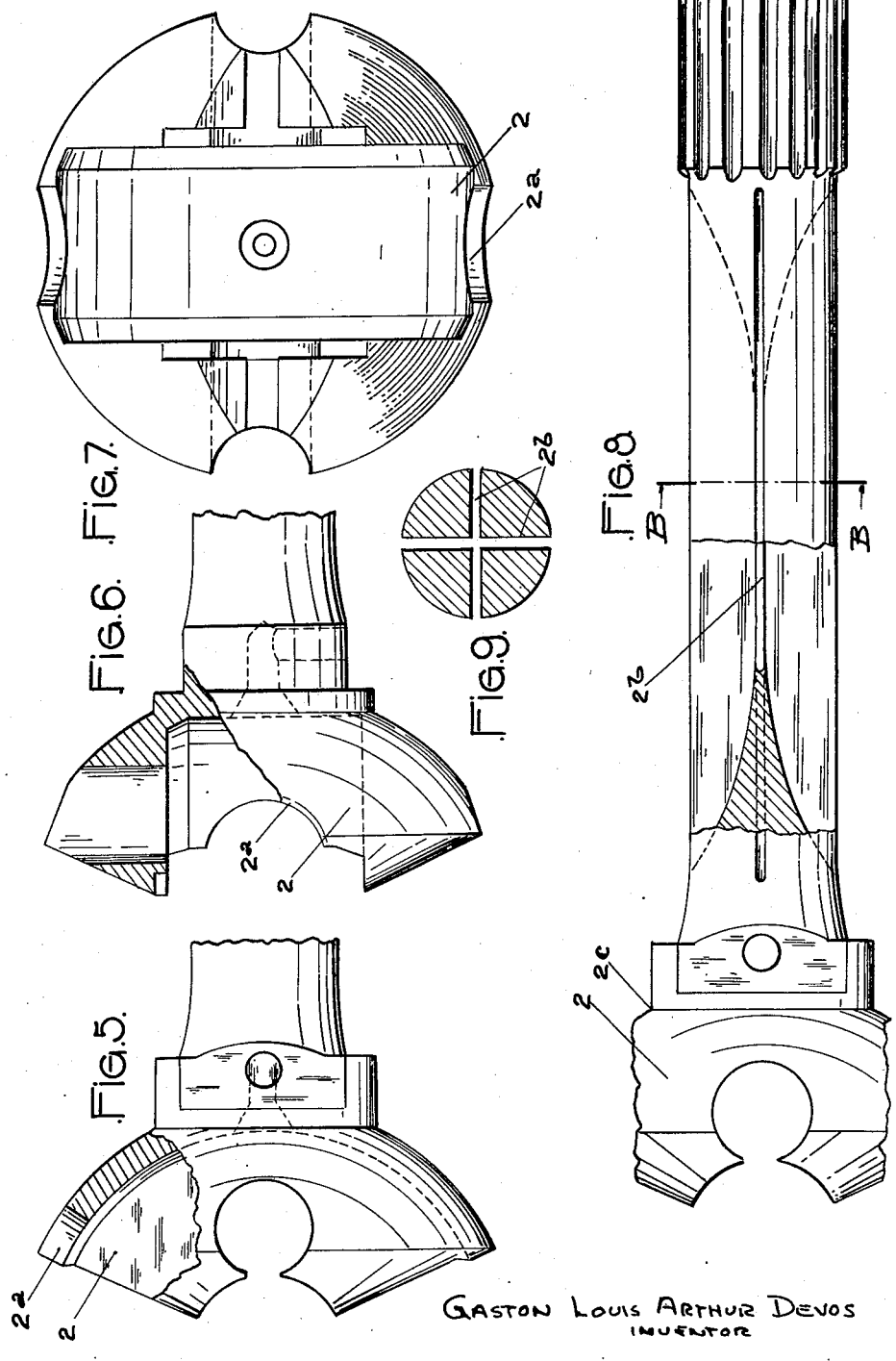

Oct. 21, 1952 G. L. A. DEVOS 2,614,404
HOMOKINETIC JOINT
Filed Oct. 5, 1948 8 Sheets-Sheet 4

GASTON LOUIS ARTHUR DEVOS
INVENTOR

By *Flocks and Simon*
ATTORNEYS

Oct. 21, 1952　　　G. L. A. DEVOS　　　2,614,404
HOMOKINETIC JOINT
Filed Oct. 5, 1948　　　　　　　　　　　　8 Sheets-Sheet 5
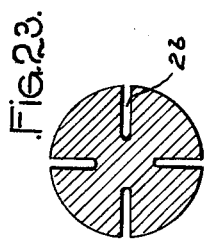
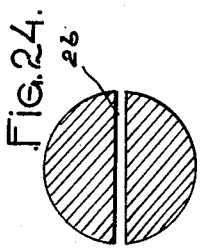
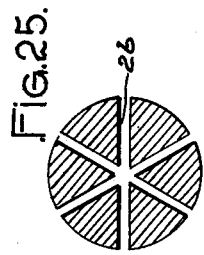
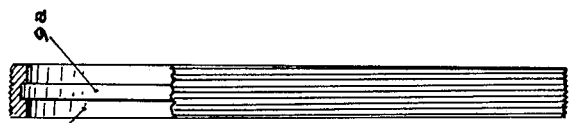
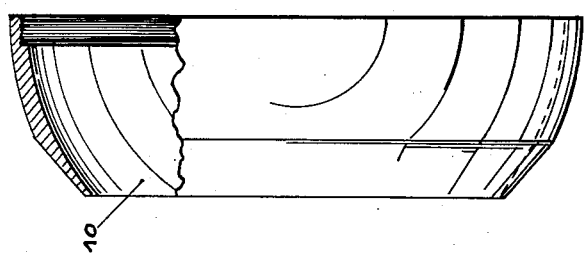
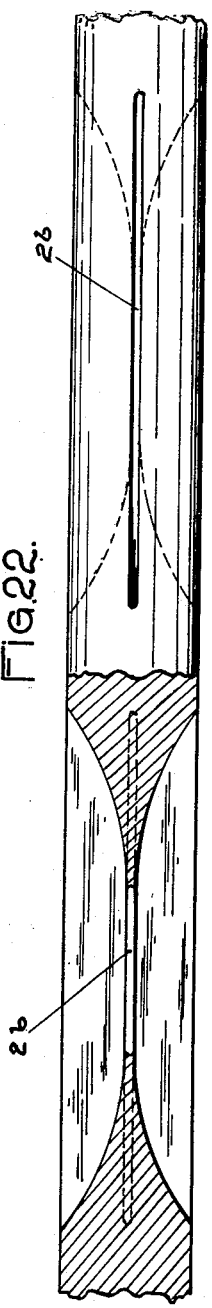
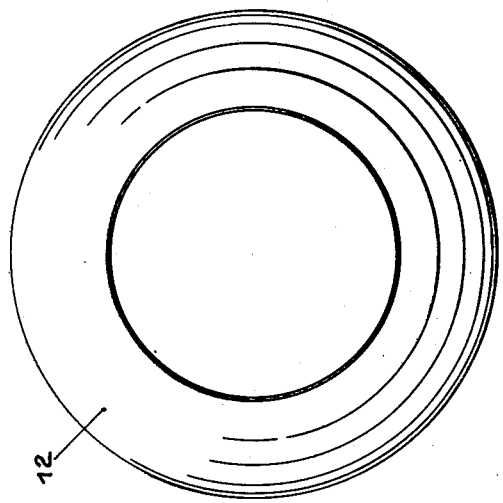
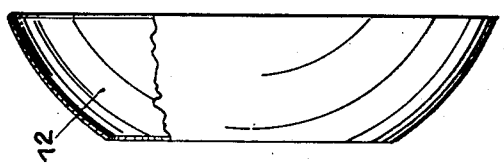
Gaston Louis Arthur Devos
INVENTOR
By Flocks and Simon
ATTORNEYS Oct. 21, 1952 — G. L. A. DEVOS — 2,614,404
HOMOKINETIC JOINT
Filed Oct. 5, 1948 — 8 Sheets-Sheet 6
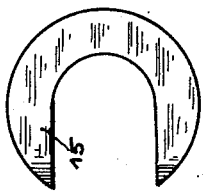
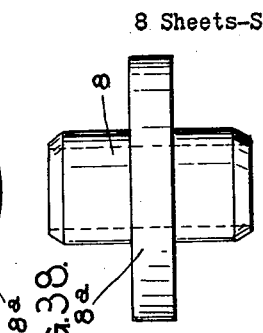
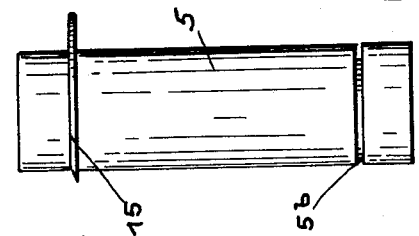
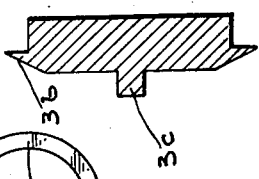
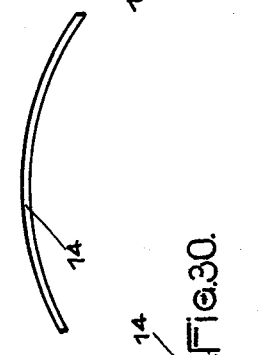
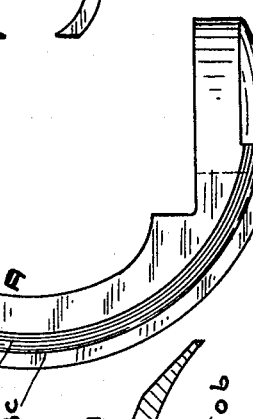
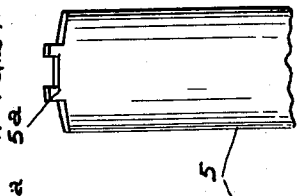
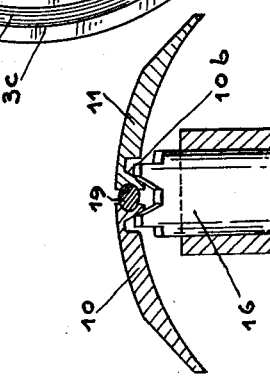
Gaston Louis Arthur Devos
INVENTOR
By Plocks and Simon
ATTORNEYS Oct. 21, 1952 G. L. A. DEVOS 2,614,404
HOMOKINETIC JOINT
Filed Oct. 5, 1948 8 Sheets-Sheet 7
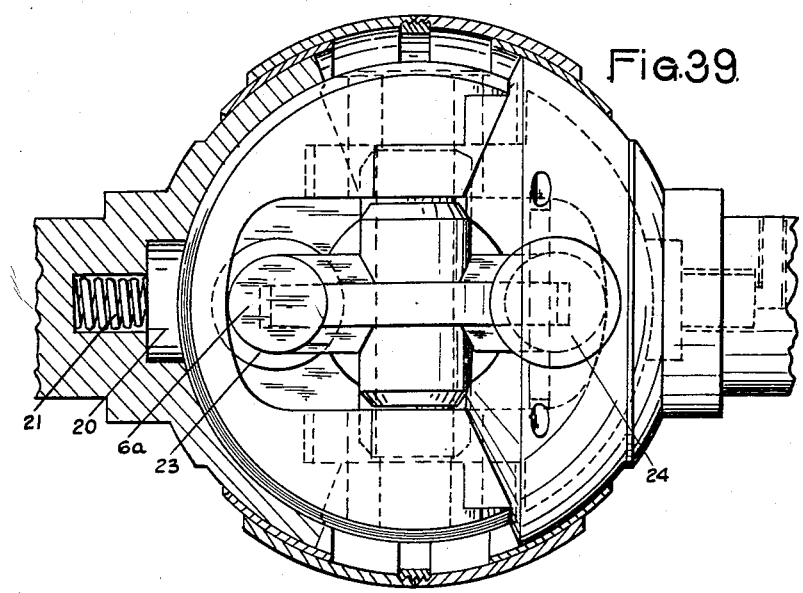
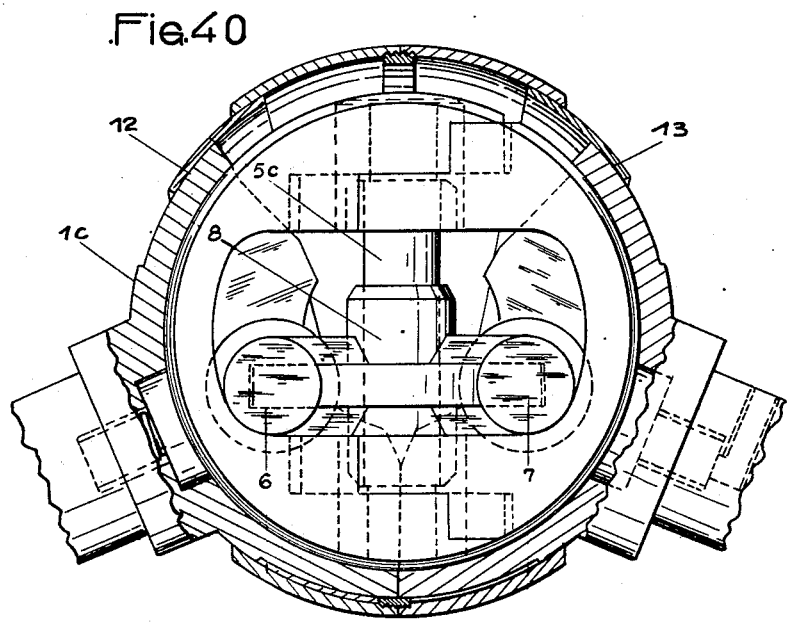
Gaston Louis Arthur Devos
INVENTOR
By Plocks and Simon
ATTORNEYS Oct. 21, 1952          G. L. A. DEVOS          2,614,404
HOMOKINETIC JOINT
Filed Oct. 5, 1948                                    8 Sheets-Sheet 8
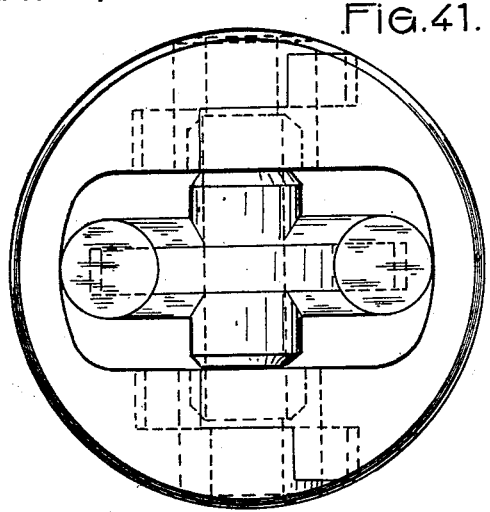
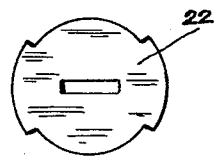
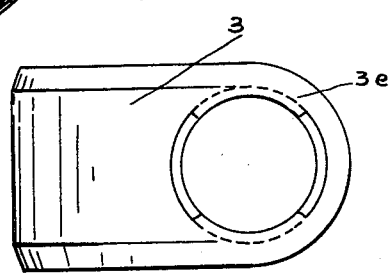
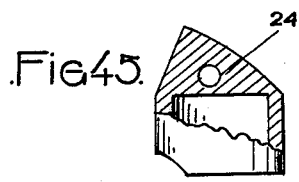
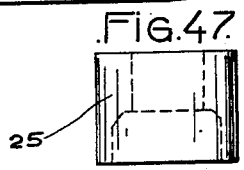
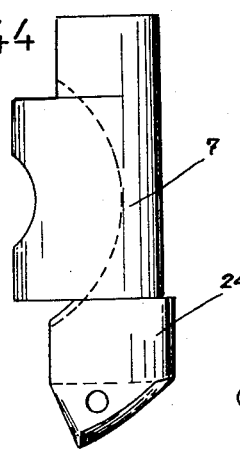
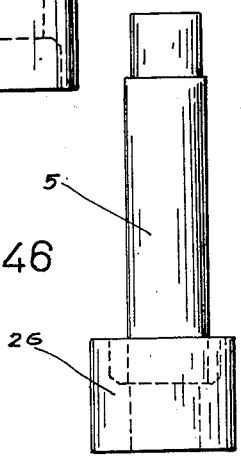
GASTON LOUIS ARTHUR DEVOS
INVENTOR
BY Plocker and Simon
ATTORNEYS Patented Oct. 21, 1952

2,614,404

UNITED STATES PATENT OFFICE 2,614,404

HOMOKINETIC JOINT

Gaston Louis Arthur Devos, Paris, France

Application October 5, 1948, Serial No. 52,885
In France January 19, 1948

4 Claims. (Cl. 64—21)

The present invention relates to improvements in transmission joints for shafts of variable relative angular position, and enables perfectly homokinetic joints to be obtained in which the transmission is effected smoothly without jerks by means of a plurality of sets of members, the symmetry of which with respect to the medial axis of the joint is always constantly retained.

A joint according to the present invention essentially comprises two segments, each of which is adapted to rotate in a groove of a jaw supported by the end of the corresponding shaft, said two segments being coupled to one another by a pivot which is constantly retained along the bisector of the angle formed by the two shafts, by means of a guide member which is adapted to slide on said pivot and with which are engaged driving pins which are at right angles to the pivot and which are respectively supported by each of the jaws, in bores of which they are adapted to pivot.

Other features of the invention, as well as certain modifications of construction will become apparent from the ensuing description which is made with reference to the accompanying diagrammatic drawings in which:

Fig. 5 shows one of the jaws partly in section;

Fig. 6 shows this same jaw after it has been rotated a quarter of a revolution;

Fig. 7 is an end view of said jaw in the position which it occupies in Fig. 5;

Fig. 8 shows a longitudinally slotted movable shaft;

Fig. 9 is a sectional view of said shaft along the line A—B of Fig. 8;

Figure 17:
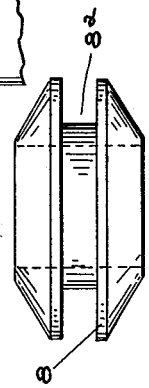
Figure 16:
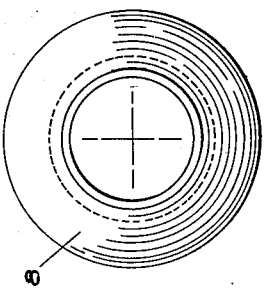
Figure 10:
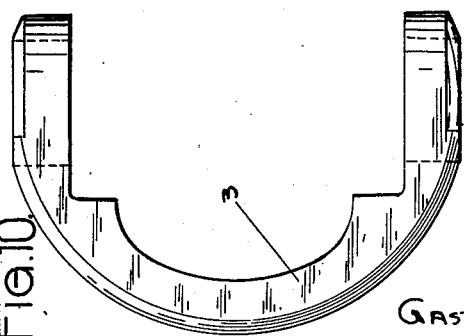
Figs. 10 and 11 show an elevational and a plan view of a female segment and Fig. 12 a plan view of a male segment.
Figure 11:
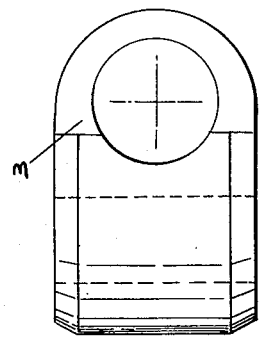

Figs. 16 and 17 respectively show elevational and plan views of the guide member;

Figs. 18 and 19 respectively show a longitudinal section and an elevational view of a relay cap;

Fig. 20 shows a longitudinal section of a casing cap;

Fig. 21 shows a screw-threaded collar;

Figs. 22 to 25 show a modification of construction of the longitudinal slots of the movable shafts;

Figs. 26 and 27 show a modification of the pivot;

Fig. 28 shows the collar corresponding to this modification;

Fig. 29 shows a modification of the coupling of the casing caps, providing an automatic take-up of the play and the locking of the pivot in the axial direction;

Figs. 30 and 31 show fragments of a play take-up gasket;

Figs. 32 and 33 show a modification of the axial locking device for the pivot;

Figs. 34 and 35 show a modification of construction of the coupling segments.

Fig. 36 shows a segmented spring;

Figs. 37 and 38 respectively show elevational and plan views of a modification of the guide member;

Fig. 39 shows an elevational view, partly in section, of another embodiment of the joint according to the invention, the movable shafts being in alignment with one another.

Fig. 40 is a similar view, with the movable shafts arranged at an angle to one another;

Fig. 41 shows the assembly of the transmission members of said joint;

Figs. 42 to 47 are detail views of the various members of said joint.

Figure 1:
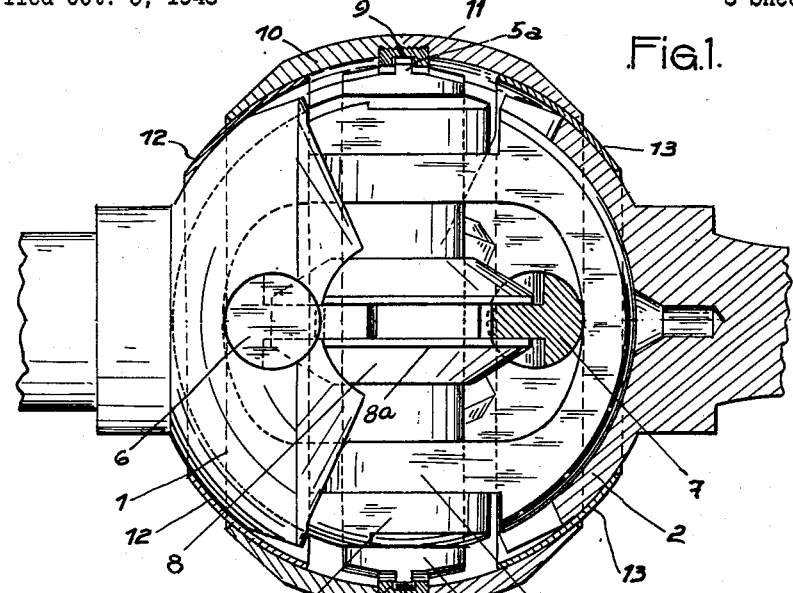
Fig. 1 is an elevational view with parts in section of a joint according to a first embodiment, the two movable shafts being located in alignment with one another.
Figure 2:
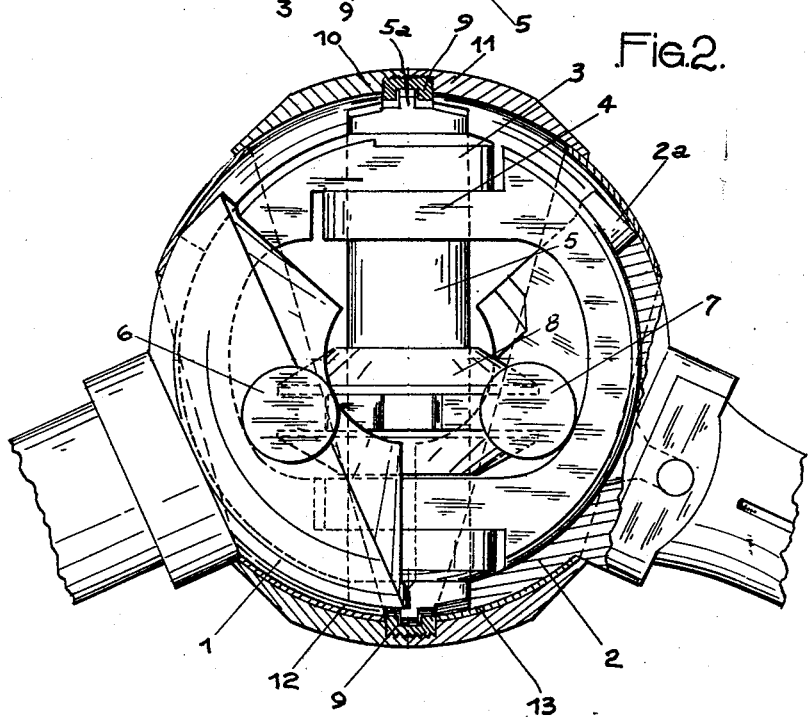
Fig. 2 is a similar view, the movable shafts being arranged at an angle to one another.
Figure 3:
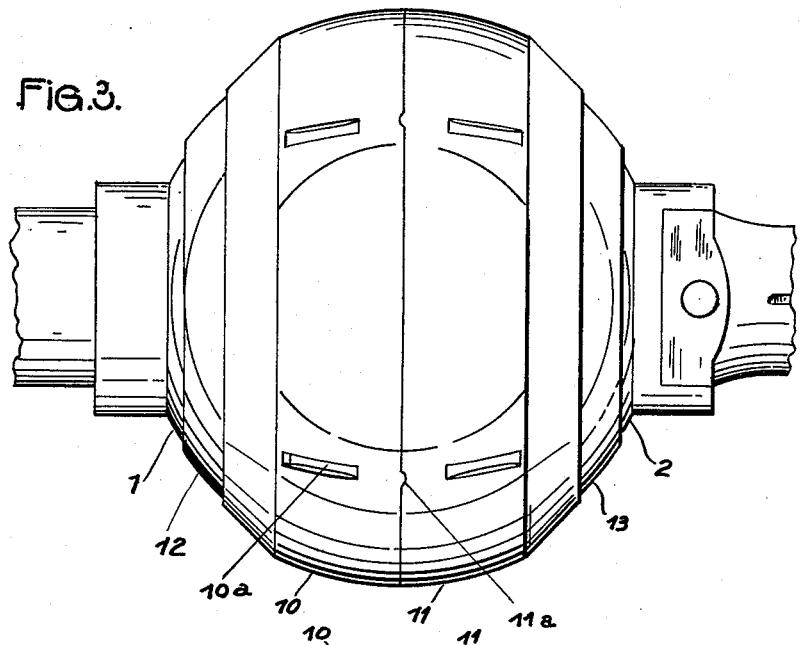
Figs. 3 and 4 are perspective views of this same joint in the two corresponding positions.
Figure 4:
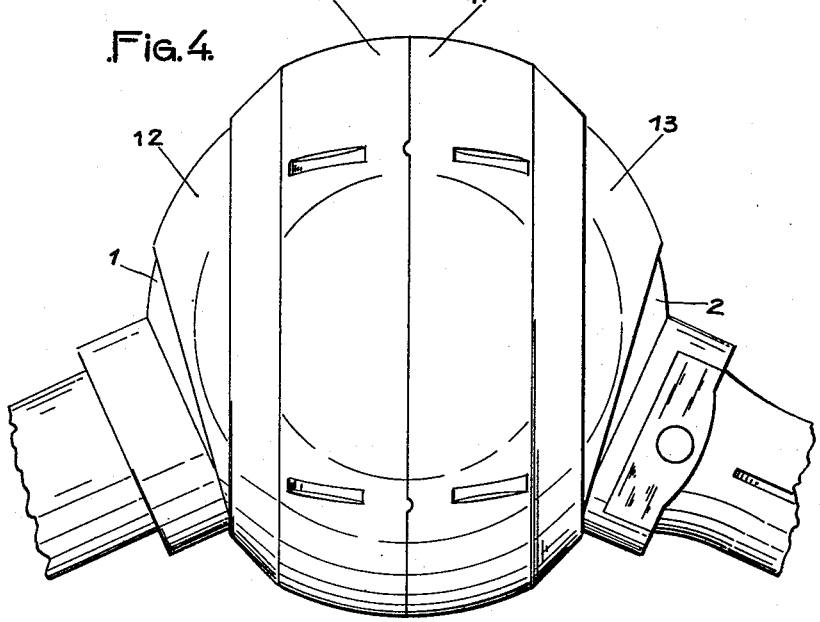
Figure 15:
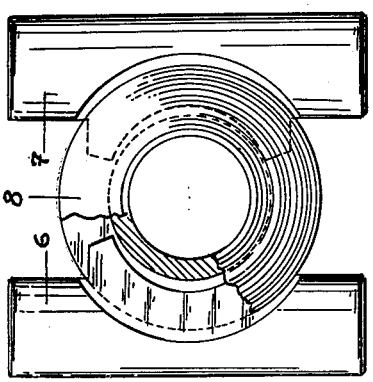
Fig. 15 shows the coupling of two driving pins to the guide member.
Figure 14:
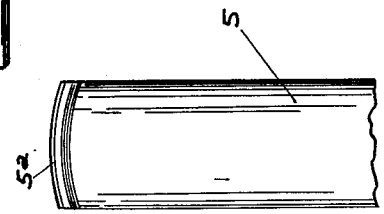
Figs. 13 and 14 show respectively a front and a side elevation of a pivot for the segments.
Figure 13:
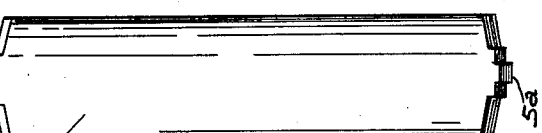
Figure 12:
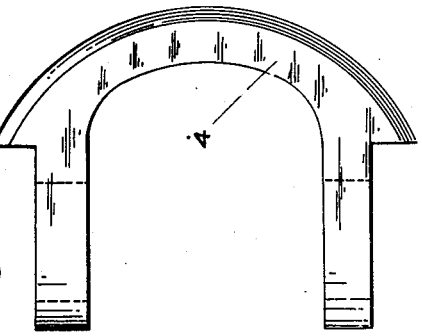

In the joint illustrated in Figs. 1 to 21, the two movable shafts terminate in two symmetrical jaws 1, 2. In a groove of the jaw 1 a female segment 3 is adapted to slide in a diametrical plane, while in a similar groove of the jaw 2 (Figs. 1, 5 and 7) a male segment 4 is adapted to slide under the same conditions. These two segments (Figs. 1 and 10 to 12) are retained in their housing by the backs of the driving pins 6—7 (Figs. 1 and 15) and are coupled to one another by a pivot 5 (Figs. 1, 13 and 14), the geometrical axis of which passes through the geometrical centre of the joint and constantly coincides with the bisector of the angle subtended between the geometrical axes of the two shafts to be coupled. This retention of the coincidence between said bisector and said pivot is ensured by a guide member 8 (Figs. 1, 16 and 17) which is mounted loose on said pivot and in an annular groove 8a of which are engaged projections of the driving pins 6—7 which are adapted to pivot in radial bores of the corresponding jaws 1—2. The locking of the pivot 5 in the axial direction is obtained by the fact that each of its ends is provided with a projection 5a engaged in a groove 9a of a collar 9 (Figs. 1 and 21) on which screw the two half-caps 10—11 of the casing (Figs. 1 and 20). Relay caps 12—13 (Figs. 1, 18 and 19) are inserted between these casing caps and the jaws 1—2.

In order to prevent violent jerks during power transmission, a torsional elasticity is imparted to the two shafts by providing them with longitudinal slots as shown at 2b (Figs. 8 and 9). This arrangement enables the size of the jaws to be decreased without danger of their breaking. This arrangement can moveover be usefully applied to other purposes; it may in particular be applied to torsion bars.

The joint which has just been described operates under the following conditions:

When the two shafts are in alignment with one another (Fig. 1), the whole joint rotates as an integral unit without any relative movement of its various parts. On the other hand, if the two shafts are arranged at an angle to one another (Fig. 2), the segments 3—4 swing about the pivot and slide in the jaws 1—2; the driving pins in turn slide axially in the guide member 8 and pivot in the bores of the jaws 1—2; the guide member 8 engages further over the driving pins 6—7 and slides on the pivot 5. The relay caps 12—13 move between the jaws 1—2 and the casing caps 10—11, their travel being limited by the collar 9 and the shoulder of the jaws 1—2 which are provided with recesses as shown at 2a. The casing 10—11 remains centred on the bisector of the joint by means of the collar 9 and the pivot 5.

It is very easy to assemble the members of this joint. The segments 3—4 are inserted in their respective jaws 1—2 and are retained therein by placing the driving pins 6—7 in position in their respective bores. The pivot 5 is then inserted in the bores of the segments 3—4, which are thus coupled together, and in the bore of the guide member which is thus centred. The collar 9 is then placed in position, by slightly ovalizing it, thereby increasing the diameter thereof. The projections 5a are then positioned in the grooves 9a by snapping the collar 9 in place on the shoulders of the pivot 5. The relay caps 12—13 are placed on the jaws 1—2 and finally the casing caps 10—11 are screwed on the collar 9, on the flanks of which are inserted foil washers or gaskets such as 14 (Figs. 30 and 31) which enable play to be taken up in case of wear. Notches 10a (Fig. 3) are provided for screwing the casing caps 10—11 which are locked by punching the portions facing the recesses 11a.

Figs. 22 to 25 show modifications of construction of the longitudinal slots provided in the two movable shafts to be coupled. The slots 2b may be provided symmetrically or not in different places and the number thereof may vary.

In the modification shown in Figs. 26 to 28, the ends of the pivot 5 are provided with two shoulders 5a which straddle the collar 9 which is provided with recesses 9a to accommodate them.

According to another modification shown in Fig. 29 one of the ends or both of the ends of the pivot 5 are provided with a bore in which is housed a locking piston 16 provided with shoulders of complemental shape to the circular grooves 10b provided in the casing caps 10—11. The caps are thus coupled to one another and, by giving to said grooves a frusto-conical cross-section, an automatic take-up of the play is obtained by the action of the spring 17. A felt washer 19 provides fluid-tightness between the caps 10—11.

In Figs. 32 and 33 another modification has been shown according to which the locking of the pivot 5 in the axial direction is obtained by means of recessed washers 15 housed in circular grooves 5b of said pivot and interposed between the coupling segments 3—4. The chamfer with which they are provided is turned over in slots provided in one of said segments to which they are thus locked.

In the modification shown in Figs. 34 and 36, the locking of the pivot 5 in the axial direction is obtained by means of segmented springs 18 engaged in circular grooves 3a provided in the bores of the female segment 3. Cylindrical plates of the same diameter as the bores may be interposed between the segmented springs 18 and the ends of the pivot 5.

In the arrangement of Figs. 34 and 35, the segments 3 and 4 are provided with semi-circular shoulders 3b which retain them in the jaws, the grooves of which are in this case shaped accordingly.

Again, according to this same modification of Figs. 34 and 35, the segments 3—4 are provided with a dorsal rib 3c which increases their strength and their area of contact with the jaws, the grooves of which are provided with a housing to accommodate said rib.

Finally, in the modification of Figs. 37 to 47, play take up rollers 20 with compression springs 21 are arranged inside the jaws 1—2. The guide member is formed by a bush 8 secured to a disc 8a which is overlapped by the projections of the driving pins 6—7 instead of overlapping them as in the previous embodiments. The pins 6—7 are adapted to pivot in bushes 23—24 of complemental shape to the outside of the jaws and pinned in same. Similarly, the pivot 5 is provided with bushes 25—26 which are forcibly engaged thereon. The pivot 5 is locked in the axial direction by means of recessed plates 22 (Fig. 43) which are inserted by means of a bayonet fitting in recessed circular grooves 3e of the segment 3 (Fig. 42) and locked by punching the end of the recesses of said grooves. The jaws are provided with reinforcing shoulders 2c (Fig. 40) against which the relay caps 12—13 are adapted to abut.

Thus, according to the invention, a perfectly homokinetic joint is obtained which has a multiple drive. Homokineity is obtained owing to the symmetry of position of the symmetrical members located on either side of the medial axis of the joint and to the synchronism of their movements. The multiple drive is obtained by means of the combination of the coupling segments and the driving pins. The perpendicular position of said segments relatively to that of said pins furthermore ensures constant smoothness in the transmission of power. Furthermore, the central pivot forms a complementary transmission member between the driving segments which it couples and the driving pins which guide it by means of the guide member.

I claim:

1. A homokinetic joint for shafts of variable relative angular position which comprises a jaw secured to the coupling end of each shaft, each jaw having a groove and a bore therein, a segment mounted on each jaw and rotating in said groove, a pivot coupling said segments to one another, a guide member retaining said pivot constantly on the bisector of the angle formed between the two shafts and sliding on said pivot, a pair of half caps forming a casing, a collar on which the half caps are engaged, said collar positioned on said pivot; a driving pin pivotally mounted in the bore of each jaw at right angles to said pivot, and operatively engaging said member, said guide member comprising a disc slidably mounted on the pivot of the segments and a circular groove provided in the disc engaging projections carried by each driving pin.

2. A homokinetic joint for shafts of variable relative angular position, which comprises a jaw secured to the coupling end of each shaft, each jaw having a groove, and a bore therein, a segment mounted on each jaw and rotating in said groove, a pivot coupling said segments to one another, a guide member retaining said pivot constantly on the bisector of the angle formed between the two shafts and sliding on said pivot, a driving pin pivotally mounted in the bore of each jaw at right angles to said pivot and operatively engaging said guide member, tenons provided on the ends of the pivot, a grooved collar engaging said tenons, a pair of half caps forming a casing, said casing centered on the axis of the joint, said half caps secured on the collar, and a relay cap inserted between each of the jaws and the corresponding casing cap.

3. A homokinetic joint for shafts of variable relative angular position which comprises jaws secured to the coupling end of each shaft, each jaw having a groove and a bore therein, a segment mounted on each of said jaws and rotating in said groove, each segment having its inner periphery formed with a curved portion, a pivot for coupling said segments to one another, a guide member retaining said pivot constantly on the bisector of the angle formed between the two shafts and sliding on said pivot, driving pins pivotally mounted in the bore of said jaws at right angles to said pivot, and engaging said guide member, means cooperating with said driving pins for maintaining the joint assembled against axial tension, said driving pins having wide flat bearing surfaces cooperating with wide flat bearing surfaces of said guide members, whereby the drive of one of the shafts by the other is effected on the one hand by means of the two segments mounted on the pivot, and on the other hand by means of said flat bearing surfaces of the driving pins and of the guide member, said driving pins being mounted in the joint such that each driving pin is tangential to the curved portion of the inner periphery of the corresponding segment which it thus retains in its housing.

4. A homokinetic joint for shafts of variable relative angular position, which comprises a jaw secured to the coupling end of each shaft, each of said jaws having a groove and a bore therein, a segment mounted on each of said jaws and adapted to rotate in said groove, each segment having its inner periphery formed with a curved portion, a pivot for coupling said segments to one another, a guide member adapted to retain said pivot constantly on the bisector of the angle formed between the two shafts and to slide on said pivot, and driving pins pivotally mounted in the bore of each of said jaws, at right angles to said pivot, and adapted to engage said guide member, a pair of half caps forming a casing, said half caps cooperating with the driving pins to maintain the device assembled against axial tension, said driving pins having wide flat bearing surfaces adapted to cooperate with wide flat bearing surfaces of said guide member, whereby the drive of one of the shafts by the other is effected, on the one hand by means of the two segments mounted on the pivot, and on the other hand by means of said flat bearing surfaces of the driving pins and of the guide member, said driving pins being mounted in the joint such that each driving pin is tangential to the curved portion of the inner periphery of the corresponding segment which it thus retains in its housing.

GASTON LOUIS ARTHUR DEVOS.

REFERENCES CITED

The following references are of record in the file of this patent:

UNITED STATES PATENTS

| Number | Name | Date |
|---|---|---|
| 1,315,782 | Leggett | Sept. 9, 1919 |
| 1,965,853 | Morrison | July 10, 1934 |
| 2,234,296 | Wollner | Mar. 11, 1941 |

FOREIGN PATENTS

| Number | Country | Date |
|---|---|---|
| 789,516 | France | 1935 |